(12) United States Patent
Chen

(10) Patent No.: US 8,725,409 B2
(45) Date of Patent: May 13, 2014

(54) VEHICLE NAVIGATION SYSTEM AND NAVIGATION METHOD THEREOF

(75) Inventor: Chia-Yang Chen, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 1021 days.

(21) Appl. No.: 12/551,714

(22) Filed: Sep. 1, 2009

(65) Prior Publication Data
US 2010/0292918 A1 Nov. 18, 2010

(30) Foreign Application Priority Data

May 18, 2009 (CN) .......................... 2009 1 0302417

(51) Int. Cl.
G06F 17/00 (2006.01)
G06F 19/00 (2011.01)
G08G 1/123 (2006.01)
G01C 21/26 (2006.01)

(52) U.S. Cl.
USPC ....... 701/411; 701/414; 701/532; 340/995.13

(58) Field of Classification Search
USPC ......... 701/400, 408–411, 414, 418, 423, 425, 701/430, 532, 533; 340/988, 995.19, 995.2, 340/995.21, 995.13, 995.14
See application file for complete search history.

(56) References Cited

U.S. PATENT DOCUMENTS

| | | | | |
|---|---|---|---|---|
| 5,862,509 A * | 1/1999 | Desai et al. | | 701/209 |
| 5,924,075 A * | 7/1999 | Kanemitsu | | 705/6 |
| 5,931,888 A * | 8/1999 | Hiyokawa | | 701/208 |
| 6,119,095 A * | 9/2000 | Morita | | 705/5 |
| 6,209,026 B1 * | 3/2001 | Ran et al. | | 709/218 |
| 6,211,798 B1 * | 4/2001 | Albrecht et al. | | 340/990 |

FOREIGN PATENT DOCUMENTS

| | | |
|---|---|---|
| CN | 101246021 A | 8/2008 |
| TW | 200706902 A | 2/2007 |
| TW | 200829883 A | 7/2008 |

* cited by examiner

Primary Examiner — Thomas Tarcza
Assistant Examiner — Edward Pipala
(74) Attorney, Agent, or Firm — Novak Druce Connolly Bove + Quigg LLP

(57) ABSTRACT

A vehicle navigation system and navigation method thereof are disclosed. The vehicle navigation system comprises a location detector to acquire a current location of a vehicle, a calculation unit to calculate a navigation route from a departure location to a destination, a database including map data and a plurality of restrictions associated with restricted sites on the map data, the calculation unit calculates a navigation route from the departure location to the destination based on the map data and the plurality of restrictions. Thus, the vehicle navigation system may provide the navigation route excluding sites with possible restriction applied thereto.

18 Claims, 4 Drawing Sheets

VEHICLE NAVIGATION SYSTEM AND NAVIGATION METHOD THEREOF

BACKGROUND

1. Technical Field

The present disclosure relates a vehicle navigation system and a navigation method thereof.

2. Description of Related Art

Vehicle navigation systems provide various navigation-related functions and features. For example, some navigation systems are able to determine an optimum route along a road network from a departure location to a destination in a geographic region. The navigation systems may then provide information about the optimum route in the form of guidance that identifies the driving maneuvers required to be taken by the end user to travel from the departure location to the destination. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

Such navigation systems, however, often fail to provide navigation routes depending on restrictions associated with restrict sites, for example, official regulations. One example of the official regulations are specific crossroads that ban left or right turns during rush hour. During the rush hour, if the end user drives to reach specific crossroad and wants to turn left or right to specific road according to so-called optimum route calculated by the navigation systems, the end user will suddenly become aware of the crossroad is banning left or right turn at that time. Therefore, the end user must try another way to go to the specific road. Another example of the official regulations is the specific road is no entering during specific time, such as, the specific road is assigned as a pedestrian area or a market during the specific time, so no car is allowed to enter.

DETAILED DESCRIPTION

Figure 1:
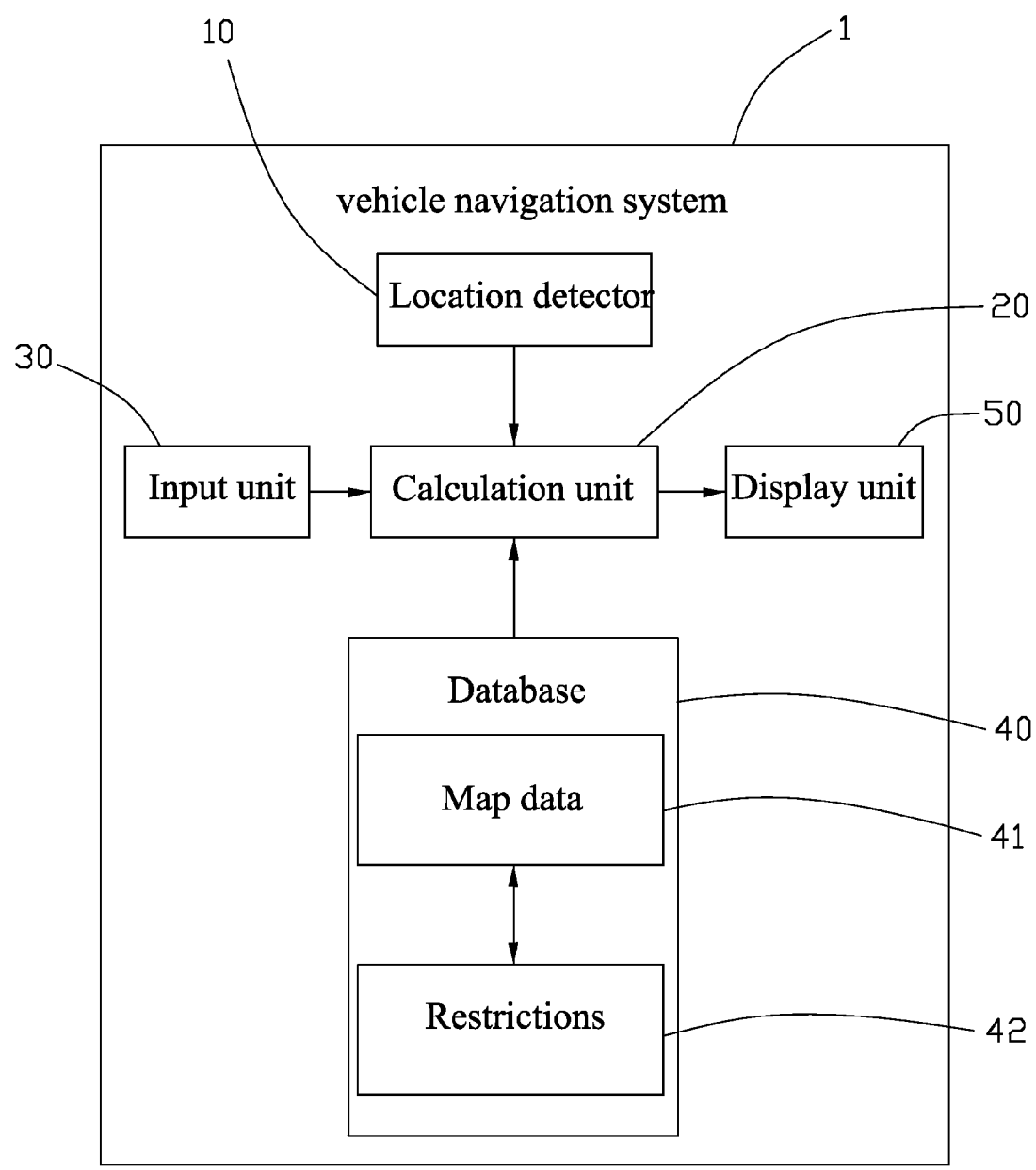
FIG. 1 is a block diagram of one embodiment of a vehicle navigation system.

FIG. 1 is a block diagram of one embodiment of a vehicle navigation system 1. The vehicle navigation system 1 comprises a location detector 10, a calculation unit 20, an input unit 30, a database 40, and a display unit 50. In one embodiment, the location detector 10 may be a GPS unit. The vehicle navigation system 1 may provide an optimum route excluding sites with possible restriction applied thereto based on the database 40.

The vehicle navigation system 1 is generally controlled and coordinated by an operating system, such as UNIX, Linux, Windows, Mac OS, an embedded operating system, or any other compatible system. Alternatively, the vehicle navigation system 1 may be controlled by a proprietary operating system. Conventional operating systems control and schedule computer processes for execution, perform memory management, provide file system, networking, and I/O services, and provide a user interface, such as a graphical user interface (GUI), among other tasks.

The location detector 10 is operable to acquire a current location of the vehicle, such as a departure location of the vehicle. Alternatively, the departure location may be determined by user input.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 2:
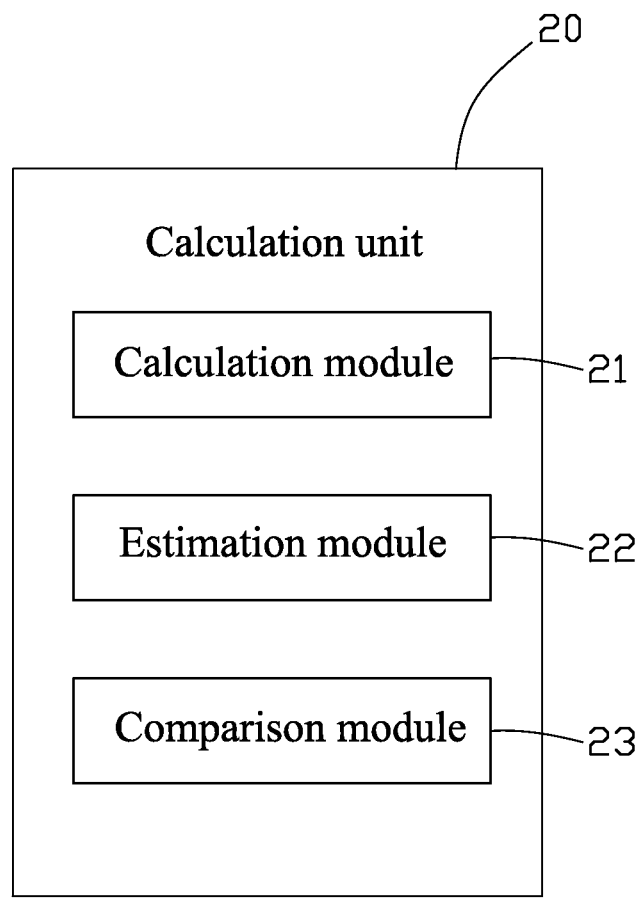
FIG. 2 is a block diagram of a calculation unit in FIG. 1.

FIG. 2 is a block diagram of calculation unit 20. The calculation unit 20 includes a calculation module 21, an estimation module 22 and a comparison module 23. The calculation module 21 is operable to calculate a navigation route from the departure location to a destination. In the embodiment, a departure time is a current system time of the vehicle navigation system 1. Alternatively, the departure time can be determined by user input. The estimation module 22 is operable to estimate a driving speed of the vehicle and an arrival time for each midway point between the departure location and the destination. The arrival time indicates the time at which the vehicle passes the midway point.

The input unit 30 is operable to input the departure location, the departure time, and the destination, and other data. In the embodiment, the input unit 30 is a touch screen or a keypad having a plurality of keys arranged thereon.

The database 40 includes map data 41 and a plurality of restrictions 42 associated with restricted sites on the map data. In the embodiment, the plurality of restrictions are determined according to official regulations. For example, one of the official regulations relate to banning left or right turn at specific crossroads during rush hours. Alternatively, the plurality of restrictions for specific sites may be determined by user input.

The calculation module 21 calculates a navigation route from the departure location to the destination based on the map data 41 and the plurality of restrictions 42 stored in the database 40, and determines the departure time and the arrival time.

Figure 3:
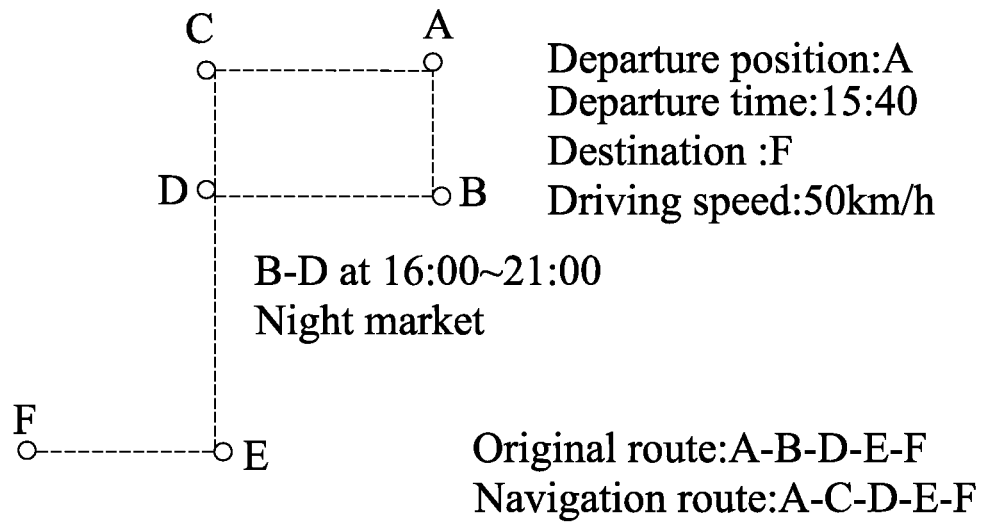
FIG. 3 shows calculation of a navigation route in the system of FIG. 1.

FIG. 3 shows one exemplary embodiment of a navigation route calculation. In the exemplary embodiment, site A is set as the departure location and the departure time is 15:40. Site F is set as the destination and the estimated driving speed is about 50 km/h. The calculation unit 20 determines a base route "A-B-D-E-F" from site A to site F. Sites B, D, and E are midway points in the base route. In one example, the comparison module 23 may compare the base route "A-B-D-E-F" with the plurality of restrictions 42 to determine that the road from site B to site D is restricted between the hours of 16:00-21:00, thus disallowing car travel along the road. It may be understood that a certain event, such as a concert or a night market may take place between the hours of 16:00-21:00. As the distance between site A and site B is 25 km and the driving time from site A to site B is estimated about 30 minutes, the arrival time for site B is about 16:10, within the restricted time. Therefore, the calculation unit 20 calculates a navigation route "A-C-D-E-F" to exclude the road from site B to site D.

Figure 4:
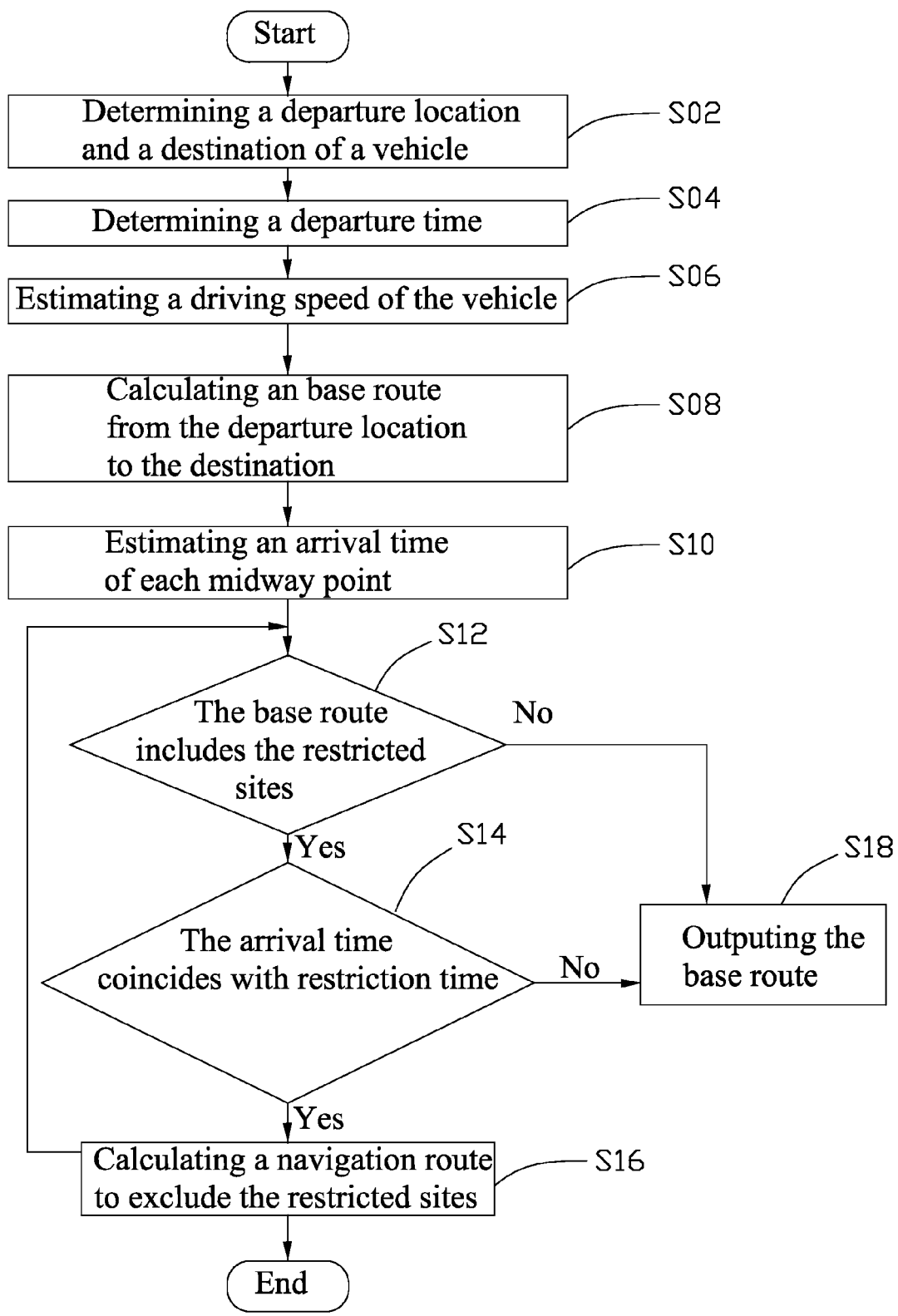
FIG. 4 is a flowchart illustrating one exemplary embodiment of a navigation method.

FIG. 4 is a flowchart of a method for vehicle navigation, applicable in, for example, the vehicle navigation system 1. Depending on the embodiment, additional blocks in the flow of FIG. 4 may be added, others removed, and the ordering of the blocks may be changed.

In block S02, the location detector 10 acquires the current location of the vehicle. The current location of the vehicle is determined as the departure location. The destination is determined by user input to the input unit 30.

In block S04, the departure time is determined by user input to the input unit 30. In block S06, the estimation module 22 estimates the driving speed of the vehicle.

In block S08, the calculation module 21 calculates a base route and the distance from the departure location to the destination based on the map data 41.

In block S10, the estimation module 22 estimates the arrival time at each midway point between the departure location and the destination based on the departure time, the driving speed and the distance between the departure location and the destination. The midway points are determined by the calculation module 21.

In block S12, the comparison module 23 compares whether the base route includes restricted sites based on the map data 41 and the restrictions 42. If the base route does not include restricted sites, in block S18, the base route is output on the display unit 50 as the optimum route.

If the base route includes restricted sites, the process goes to block S14. In block S14, the comparison module 23 compares arrival times at midway points located on restricted sites with restriction times for the restricted sites. If none of the arrival times coincide with restriction times, the process goes to block S18. Alternatively, the process goes to block S16.

In block S16, the calculation module 21 calculates a navigation route to exclude the restricted sites and outputs the navigation route on the display unit 50 as the optimum route, and the process is complete.

The navigation system and navigation method of the present disclosure determines the navigation route excluding sites with possible restriction applied thereto. An efficient driving route is thus provided reducing potential inconvenience caused by unawareness of restrictions associated with the restricted sites.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for navigation applied in a vehicle navigation system, the vehicle navigation system comprises a database comprising map data and a plurality of restrictions associated with restricted sites on the map data, the method comprising:
    determining a departure location and a destination of a vehicle;
    determining a departure time of the vehicle;
    estimating a driving speed of the vehicle;
    estimating an arrival time at each midway point between the departure location and the destination based on the driving speed; and
    calculating a navigation route from the departure location to the destination based on the map data, the plurality of restrictions stored in the database, the departure time and the arrival time, comprising:
    calculating a base route from the departure location to the destination based on the map data;
    determining whether the base route comprises the restricted sites;
    determining if the estimated arrival times to any midway points located at the restricted sites match restriction times for the restricted sites; and
    calculating the navigation route excluding the restricted sites from the departure location to the destination under the condition that the estimated arrival times match the restriction times for the restricted sites.

2. The method of claim 1, wherein the origin location is a current location of the vehicle.

3. The method of claim 1, wherein the departure location is determined by user input.

4. The method of claim 1, wherein the plurality of restrictions is determined according to official regulations.

5. The system of claim 1, wherein the plurality of restrictions is determined by user input.

6. The method of claim 1, further comprising:
    determining the base route as the navigation route from the departure location to the destination if the base route does not comprise any restricted sites.

7. A vehicle navigation system comprising:
    a database comprising map data and a plurality of restrictions associated with restricted sites on the map data;
    a location detector to acquire a current location of a vehicle;
    a calculation unit to determine a departure time of the vehicle, and calculate a base route from the departure location to the destination based on the map data;
    an estimation module to estimate a driving speed of the vehicle, and estimate an arrival time for each midway point between the departure location and the destination based on the driving speed;
    a comparison module to determine whether the base route comprises the restricted sites, and determine if the estimated arrival times to any midway points located at the restricted sites match restriction times for the restricted sites; and
    the calculation unit further to calculate the navigation route excluding the restricted sites from the departure location to the destination under the condition that the estimated arrival times match the restriction times for the restricted sites, based on the map data, the plurality of restrictions stored in the database, the departure time and the arrival time.

8. The system of claim 7, wherein the departure location is the current location of the vehicle.

9. The system of claim 7, wherein the departure location is determined by user input.

10. The system of claim 7, wherein the plurality of restrictions for restricted sites is determined according to official regulations.

11. The system of claim 7, wherein the plurality of restrictions for restricted sites is determined by user input.

12. The system of claim 7, wherein the calculation unit is further to determine the base route as the navigation route from the departure location to the destination if the base route does not comprise any restricted sites.

13. A non-transitory storage medium having stored thereon instructions that, when executed by a processor, cause the processor to perform a navigation method applied in a vehicle navigation system, the vehicle navigation system comprises a database comprising map data and a plurality of restrictions associated with restricted sites on the map data, the method comprising:
    determining a departure location and a destination of a vehicle;

determining a departure time of the vehicle;
estimating a driving speed of the vehicle;
estimating an arrival time at each midway point between the departure location and the destination based on the driving speed; and
calculating a navigation route from the departure location to the destination based on the map data, the plurality of restrictions stored in the database, the departure time and the arrival time, comprising:
calculating a base route from the departure location to the destination based on the map data;
determining whether the base route comprises the restricted sites;
determining if the estimated arrival times to any midway points located at the restricted sites match restriction times for the restricted sites; and
calculating the navigation route excluding the restricted sites from the departure location to the destination under the condition that the estimated arrival times match the restriction times for the restricted sites.

14. The non-transitory storage medium of claim 13, wherein the origin location is a current location of the vehicle.

15. The non-transitory storage medium of claim 13, wherein the departure location is determined by user input.

16. The non-transitory storage medium of claim 13, wherein the plurality of restrictions is determined according to official regulations.

17. The non-transitory storage medium of claim 13, wherein the plurality of restrictions is determined by user input.

18. The non-transitory storage medium of claim 13, wherein the method further comprises:
determining the base route as the navigation route from the departure location to the destination if the base route does not comprise any restricted sites.

* * * * *